(12) United States Patent
Mack (10) Patent No.: US 6,411,914 B1
(45) Date of Patent: Jun. 25, 2002

(54) SYSTEM AND METHOD FOR COHERENT SIGNAL DETECTION USING WAVELET FUNCTIONS

(75) Inventor: Andrew Paul Mack, Minneapolis, MN (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/450,317

(22) Filed: Nov. 29, 1999

(51) Int. Cl.[7] .............................................. G06F 15/00
(52) U.S. Cl. ........................................ 702/74; 702/191
(58) Field of Search .......................... 702/74, 189, 190, 702/191; 708/400, 401

(56) References Cited

U.S. PATENT DOCUMENTS

| | | | | |
|---|---|---|---|---|
| 4,001,720 A | * | 1/1977 | Chen ........................... | 342/25 |
| 4,818,101 A | | 4/1989 | Soreide et al. | |
| 4,973,969 A | | 11/1990 | Jenson | |
| 5,164,784 A | | 11/1992 | Waggoner | |
| 5,272,513 A | | 12/1993 | Vahala | |
| 5,289,391 A | | 2/1994 | Ibrahim et al. | |
| 5,436,447 A | * | 7/1995 | Shew .......................... | 250/282 |
| 5,561,431 A | * | 10/1996 | Peele et al. .................. | 342/192 |
| 5,592,171 A | * | 1/1997 | Jordan ........................ | 342/192 |
| 5,621,766 A | | 4/1997 | Bakke et al. | |
| 5,638,396 A | * | 6/1997 | Klimek ....................... | 372/102 |
| 5,724,138 A | * | 3/1998 | Reich et al. ................ | 356/492 |
| 5,740,036 A | * | 4/1998 | Ahuja et al. .................. | 702/17 |
| 5,952,957 A | * | 9/1999 | Szu ............................. | 342/179 |
| 5,990,823 A | * | 11/1999 | Peele et al. .................. | 342/192 |
| 6,097,669 A | * | 8/2000 | Jordan et al. ................ | 342/159 |

OTHER PUBLICATIONS

Hung et al., "FPGA Implementation for 2D Discrete Wavelet Transform", IEEE, Apr. 1998.*
Reza et al., "FPGA Implementation of 2D Wavelet Transform", IEEE, 1999.*
Noel et al., "Doppler Frequency Estimation with Wavelets and Neural Networks", IEEE, Apr. 1998.*
Sarris et al., "Multiresolution Time Domain (MRTD) Schemes with Space–Time Haar Wavelets", IEEE, May 1999.*

* cited by examiner

*Primary Examiner*—Patrick Assouad
(74) *Attorney, Agent, or Firm*—James M. Rashid; Calfee, Halter & Griswold LLP (57) ABSTRACT

A method and system for detecting a coherent signal of unknown frequency from an incoming electrical signal comprising a multiplicity of frequencies is disclosed. A time sequence of sample data signals generated from the incoming electrical signal is decomposed into a plurality of frequency range signals using wavelet functions. The coherent signal is detected in the time sequence based on the frequency range signals. In one embodiment, a program gate array is used to process the time sequence of data samples using wavelet functions. In another embodiment, the data samples are decomposed using Haar scaling and wavelet functions to form smoothed and detailed components of the frequency range signals. The frequency range signals may be compared to at least one predetermined threshold signal to detect the coherent signal in the time sequence of sample data signals.

36 Claims, 4 Drawing Sheets

SMOOTHED FUNCTIONS s

*Fig. 5A* sd

*Fig. 5C* sdd

*Fig. 5E* sddd

*Fig. 5G*

DETAILED FUNCTIONS d

*Fig. 5B* dd

*Fig. 5D* ddd

*Fig. 5F* dddd

*Fig. 5H*

SYSTEM AND METHOD FOR COHERENT SIGNAL DETECTION USING WAVELET FUNCTIONS

BACKGROUND OF THE INVENTION

The present invention is directed to the detection of coherent signals, in general, and more particularly to a system for and a method of detecting a coherent signal of unknown frequency from an incoming electrical signal using wavelet functions.

An accurate and reliable detection of a coherent signal from an incoming signal with a low signal-to-noise ratio (SNR) is of paramount importance to accurate measurements in the signal processing for such applications as laser Doppler, phase Doppler, communications and burst radar, for example. For laser Doppler applications, a coherent burst of Doppler-shifted return signal occurs intermittently and for a brief duration for each associated parameter measurement. Of primary interest in the coherent signal is the Doppler frequency which is proportional to the parameter being measured and can range over several orders of magnitude approaching one gigahertz, for example. Existing methods and apparatus for real time coherent burst detection, also known as triggering, systems are disclosed in the patent literature.

One such patent, U.S. Pat. No. 4,973,969 entitled "Coherent Frequency Burst Detector Apparatus and Method", and assigned to TSI Incorporated, is directed to a burst detector method and apparatus for a laser Doppler Velocimeter (LDV) system based upon an autocorrelation technique. The TSI method includes correlation coefficients corresponding to frequencies that span exponentially the desired range of Doppler-shifted frequencies. But autocorrelation in general has limited ability to measure signals with low signal-to-noise ratios and requires high computational resources which result in a relatively low frequency response. Another patent, U.S. Pat. No. 5,289,391, entitled "Method and Apparatus for Optimum Signal Burst Detection" and assigned to Aerometrics, Inc. is directed to an LDV burst detector using the Discrete Fourier transformation (DFT). Although the DFT method of Aerometrics has a better response to low SNR, the DFT coefficients are spaced linearly in frequency and require more coefficients (i.e., more circuitry) to cover the same Doppler-shifted frequency range as that of the autocorrelation techniques.

The present invention improves over the drawbacks of both the autocorrelation and the DFT methods. For example, it has a SNR response comparable to the DFT method, but better than the autocorrelation method as described above. It also requires fewer calculations than both the autocorrelations and the DFT approaches for each respective coefficient which results in a higher frequency response. In addition, the present invention is well suited for applications requiring broad band frequency response and actually uses fewer coefficients than both the autocorrelations and DFT methods to cover the same Doppler-shifted frequency range. These improvements reduce the size and cost of any signal processing circuitry with no tradeoff in performance.

SUMMARY OF THE INVENTION

In accordance with the present invention, a method of detecting a coherent signal of unknown frequency from an incoming electrical signal comprising a multiplicity of frequencies comprises the steps of generating a time sequence of sample data signals from the incoming electrical signal, decomposing the sample data signals of the time sequence into a plurality of frequency range signals using wavelet functions, and detecting the coherent signal in the time sequence based on the frequency range signals.

Further, in accordance with the present invention, a system for detecting a coherent signal of unknown frequency from an incoming electrical signal comprising a multiplicity of frequencies comprises means for generating a time sequence of sampled data signals from the incoming electrical signal, means for processing the sampled data signals of the time sequence into a plurality of frequency range signals using wavelet functions, and means for detecting the coherent signal in the time sequence based on the frequency range signals.

Still further, in accordance with the present invention, a method of processing, in a programmed gate array, a time sequence of data samples of an electrical signal having a predetermined pass band frequency range for detecting a coherent signal therefrom comprises the steps of decomposing the data samples of the electrical signal into a plurality of frequency range signals within the predetermined pass band frequency range using wavelet functions, and detecting the coherent signal in the time sequence based on the frequency range signals. In one embodiment, the data samples are decomposed using wavelet packet functions. In another embodiment, the data samples are decomposed using Haar scaling and wavelet functions to form smoothed and detailed components of the frequency range signals. In yet another embodiment, the data samples are decomposed using a multi-resolution analysis method.

DESCRIPTION OF THE PREFERRED EMBODIMENT

A suitable environment for embodying the present invention is a laser Doppler Velocimeter (LDV) system. For such LDV systems, light generated generally from a laser source at a single frequency is focused by an assembly of optical elements on a small volume of space. When a particle passes through this volume, the laser beam is reflected resulting in a coherent signal of Doppler-shifted return signal. The difficulty in measuring the return signal in this environment is that it occurs intermittently and for a brief duration, i.e. a burst, for each associated particle. Of primary interest is the Doppler-shifted frequency of the return signal which is proportional to the particle velocity, but can range over several orders of frequency magnitude, approaching one gigahertz, for example. The accuracy and reliability in the detection of these coherent type signals with a low signal-to-noise ratio (SNR) is critical to an accurate velocity measurement.

Figure 1:
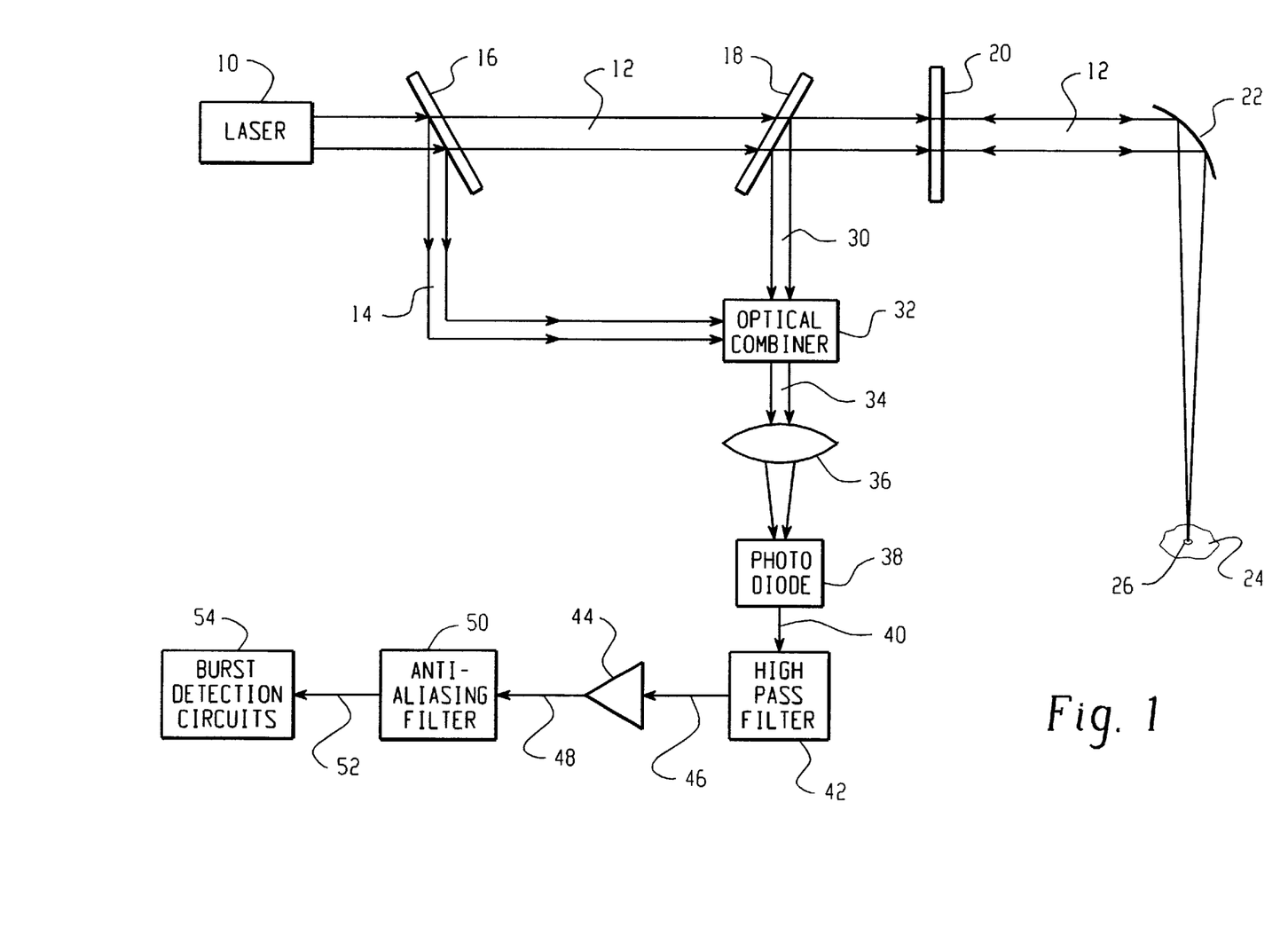
FIG. 1 is a block diagram schematic illustration of a laser Doppler Velocimeter that is a suitable environment for embodying the present invention.

A simple representation of such an LDV system is shown in the illustration of FIG. 1. Referring to FIG. 1, a laser source 10 which may be a Neodymium (Nd) or a carbon dioxide (CO2) laser, generates a continuous wave (CW) laser beam along an optical path 12. A small portion of the generated laser beam may be diverted along another optical path 14 by an optical element 16. The main laser beam continues along the optical path 12 to an optical element 18 which may be a Brewster plate which passes only one polarization mode of the laser beam, say the vertical polarization mode, for example, and reflects all others. Another optical element 20 which may be a quarter wavelength plate passes the polarized laser beam along the optical path 12 to a simple convex lens 22 which in the present embodiment is used to focus the beam onto a location in space 24. As an aerosol particle intersects the laser beam at space 24, it reflects the beam back along the same optical path 12 as the incident beam via the convex lens 22 and optical element 20. The reflected light beam is changed in polarization with respect to the incident beam and thus, is reflected by the Brewster plate 18 along another optical path 30. The reflected beam along optical path 30 and incident beam along optical path 14 are combined in an optical combiner 32.

As is well known, the light reflected from the particle 26 not only undergoes a change in polarization but also experiences a Doppler shift frequency that is proportional to the component of the relative velocity of the aerosol particle with respect to the direction of tile laser beam. The optical combiner 32 produces light along an optical path 34 which contains substantially the characteristics of the Doppler shift in frequency of the reflected beam. A convex lens 36 is disposed in tile optical path 34 for focusing the reflected light onto a photo detector 38 which may be a Gallinium Arsenide PIN diode, for example. The photo diode 38 converts the light into an electrical signal 40 representative thereof. While the elements shown in the representative example of the LDV environment depicted in FIG. 1 are simple and single elements, it is clear that they all may be rather more complex assembly of optical elements to better satisfy their functional purpose. Such optical elements form no part of the present invention but are merely illustrated to exemplify an environment in which tile present invention may be embodied.

In the present LDV environment, it is expected that the Doppler frequency range be on the order of 12 to 188 megahertz. Accordingly, a high pass filter 42 may operate oil tile electrical incoming signal 40 to pass only filtered signals 46 that are above a predetermined frequency, say 12 megahertz, for example. Thus, those electrical signals having frequencies below 12 megahertz are filtered out substantially by the filter 42. A wide band amplifier 44 is disposed at the output of the filter 42 to amplify the filtered signal 46 to a voltage level which may be on the order of one volt or so. The amplified signal 48 may be operated on by an anti-aliasing filter 50 suitable for eliminating the higher harmonics of the Doppler shifted signal that may interfere with subsequent signal analysis. Accordingly, the combination of the filters 42 and 50 passes tile incoming electrical signal within a predetermined frequency band, say on the order of between 12 and 188 megahertz substantially, for example. The resulting signal 52, referred herein as tile incoming signal, is passed to coherent signal detection circuits 54 that process tile incoming signal 52 for the detection of the coherent signal in accordance with the principles of the present invention. For more details of the optical assembly and operation of an LDV or a laser Doppler LIDAR, reference is made to the U.S. Pat. Nos. 4,818,101 and 5,164,784, both assigned to the Boeing Company of Seattle, Wash.

Figure 2:
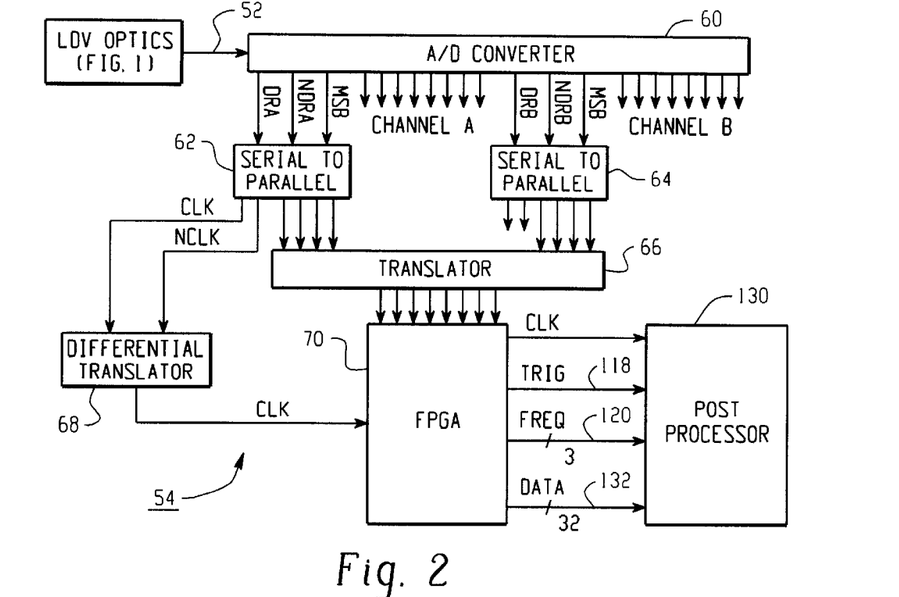
FIG. 2 is a block diagram schematic of a coherent signal detection circuit suitable for embodying the broad principals of the present invention.

A suitable embodiment of the coherent signal detection circuit 54 is shown in the block diagram schematic of FIG. 2. Referring to FIG. 2, the incoming electrical signal 52 is conducted to an analog-to-digital (A/D) converter 60 which may be of the type manufactured by Maxim Company under the Model No. MAX1151, for example. The particular A/D converter used for the present embodiment samples tile incoming signal at predetermined time intervals consistent with a frequency rate of on the order 750 megahertz, for example, and converts the sampled data signals into eight (8) bit digital data signals. The A/D converter 60 of the present embodiment has two (2) output digital channels A and B. Due to the conversion techniques of the Maxim converter, the digitized data samples are output alternately between channel A and channel B in the time sequence generation thereof. Thus, channel A may include only the odd digitized data samples and channel B the even digitized data samples in the time sequence, or vice versa. In the present embodiment, only one bit of the digitized data samples are used, like the most significant bit (MSB), for example. For all intents and purposes, in the present embodiment, the A/D converter 60 may be considered a one bit converter. Also output from each channel A and B are the data ready signals DRA and DRB and the not data ready signals NDRA and NDRB, respectively.

For each channel A and B, the three (3) output signals, namely MSB, DR and NDR are input to conventional serial to parallel converters 62 and 64, respectively. The converters 62 and 64 each buffer four (4) bits or data samples of the time sequence. Combined, the converters 62 and 64 buffer eight (8) bits or eight (8) data samples. Also, as indicated above, the A/D converter 60 samples and converts in real time at a rate of 750 megahertz. Thus, the clock rate of the alternate channels A and B is on the order of 375 megahertz rendering the outputs of the converters 62 and 64 to be on the order of 94 megahertz. Therefore, clock signals CLK and NCLK generated from the converter 62 for timing purposes are on the order of 94 megahertz. It is understood that while the present embodiment samples and converts the incoming signal for real time processing, it may also by a simple modification sample and store the samples in a buffer for a later digitization and processing or it may sample, digitize and store the digitized samples for later processing without deviating from the principles of the present invention.

A conventional translator circuit 66 may be disposed in the path between the buffered data samples in circuits 62 and 64 and a field programmable gate array (FPGA) 70 for converting the digital logic voltage levels between logic circuits of different types. In addition, a conventional differential translator 68 may be disposed in the path between the signals CLK and NCLK to produce the signal CLK that is provided to the FPGA 70 for timing purposes. In the present embodiment, the serial to parallel converters 62 and 64 and the translators 66 and 68 may be conventional, off-the-shelf components manufactured by, for example, Motorola Corporation. Also in the present embodiment, the FPGA 70 may be of the type manufactured by Xilinx Company having the Model No. XCV50-6, for example, including on the order of 50,000 gates.

In accordance with the present invention, the gate array 70 is programmed to process the sampled data signals of the time sequence into a plurality of frequency range signals using wavelet functions. The gate array 70 is also programmed to detect a coherent signal in the time sequence based on the frequency range signals output thereby, as will become more evident from the following description.

The wavelet function method used for programming the gate array 70 includes a wavelet packet function that provides a set of scaling functions and wavelets with which to decompose the incoming signal into smoothed and detailed components, respectively. In the present embodiment, for each signal sample, the signal is recursively decomposed to time scales double the previous, i.e., frequencies half of the previous. Although it is understood that the proposed method for coherent signal detection can be implemented with any set of scaling functions and wavelets the Haar wavelet is chosen, by way of example, because of its simplicity and ease of use in explaining the inventive method. Accordingly, the basis Haar function, or "father wavelet" is:

$$\phi(t) = \begin{cases} 1; & 0 \leq t < 1 \\ 0; & \text{otherwise} \end{cases} \qquad \text{Equation 1}$$

and the corresponding "mother wavelet" is represented by the equation:

$$\psi(t) = \begin{cases} 1; & 0 \leq t < 1/2 \\ -1; & 1/2 \leq t < 1 \\ 0; & \text{otherwise} \end{cases}$$

The general scaling and wavelet functions for n>0 may be represented by the following Equations 3 and 4:

and $$\phi^n_k(t) = 2^{-2/n}\phi(2^{-n}t-k); k=\ldots,-1,0,1,\ldots; n=1,2,3,\ldots \qquad \text{Equation 3}$$

$$\psi^n_k(t) = 2^{-2/n}\psi(2^{-n}t-k). \qquad \text{Equation 4}$$

The aforementioned wavelet functions are simply the basis functions translated in time (for k≠0) or dilated (stretched in time and compressed in amplitude n>0) to allow decomposition of the sampled data signals at different time scales.

If the data samples of the incoming signal $f$ are sampled every $\Delta t$ seconds, the samples may be represented by $f^0_i$, where the samples are indexed i=1, 2, 3 consecutively in the time sequence. The wavelet packet function method thus decomposes $f^0$ into a smoothed component $s^1$ and a detailed component $d^1$ for each at a 2 $\Delta t$ second sampling. In accordance with the following equations:

$$s^1_i = \langle f^0_i, \phi^1_i \rangle = \frac{1}{\sqrt{2}}(f^0_{2i-1} + f^0_{2i}) \qquad \text{Equation 5}$$

$$d^1_i = \langle f^0_i, \phi^1_i \rangle = \frac{1}{\sqrt{2}}(f^0_{2i-1} - f^0_{2i}) \qquad \text{Equation 6}$$

Each component $s^1$ or $d^1$ having a 2 $\Delta t$ sampling can recursively be decomposed into smoothed components $ss^2$ and $sd^2$ and detailed components $ds^2$ and $dd^2$, each with a 4 $\Delta t$ sampling. In accordance with the following equations:

$$ss^2_i = \langle s^1_i, \phi^2_i \rangle = \frac{1}{\sqrt{2}}(s^1_{2i-1} + s^1_{2i}), \qquad \text{Equation 7}$$

$$sd^2_i = \langle d^1_i, \phi^2_i \rangle = \frac{1}{\sqrt{2}}(d^1_{2i-1} + d^1_{2i}), \qquad \text{Equation 8}$$

$$ds^2_i = \langle s^1_i, \psi^2_i \rangle = \frac{1}{\sqrt{2}}(s^1_{2i-1} - s^1_{2i}), \qquad \text{Equation 9}$$

$$dd^2_i = \langle d^1_i, \psi^2_i \rangle = \frac{1}{\sqrt{2}}(d^1_{2i-1} - d^1_{2i}). \qquad \text{Equation 10}$$

In general, any signal $f^n$ can be decomposed into a smooth component signals $f^{n+1}$ and a detailed component signal $df^{n-1}$ in accordance with the following equations:

$$sf^{n+1}_i = \langle f^n_i, \phi^{n+1}_i \rangle = \frac{1}{\sqrt{2}}(f^n_{2i-1} + f^n_{2i}) \qquad \text{Equation 11}$$

$$df^{n+1}_i \langle f^n_i, \psi^{n+1}_i \rangle = \frac{1}{\sqrt{2}}(f^n_{2i-1} - f^n_{2i}). \qquad \text{Equation 12}$$

Note that each of the smoothed and detailed components represent a frequency range signal of a frequency range consistent with the order or stage of the decomposition. Accordingly, each successive decomposition stage or order splits the energy contained in the frequency range signal $f^n$ by frequency into signals $sf^{n+1}$ and $df^{n-1}$. The even decomposed frequency range signal (that with an even number of detailed decompositions) contains energy from the lower half of the frequency range and the odd decomposed signal (that with an odd number of detailed decompositions) contains energy from the upper half of the frequency range signal. For example, $f^0$ contains energy at frequencies from 0 to the Nyquist frequency $V_N$. The even decomposed signal $s^1$ contains frequencies from 0 to $V_N/2$ while the odd decomposed signal $d^1$ contains frequencies from $V_N/2$ to $V_N$. The next stage of decomposition would include the signals (and frequency bands) $ss^2$ (0–$V_N/4$), $ds^2$ ($V_N/4$–$V_N/2$), $dd^2$ ($V_N/2$–$3V_N/4$), and $sd^2$ ($3V_N/4$–$V_N$). Note that $sd^2$ contains a higher frequency component than $dd^2$ because $sd^2$ is an odd signal. In general, if $f^n$ is even, $sf^{n+1}$ is even and $df^{n+1}$ is odd, whereas if $f^n$ is odd, $sf^{n+1}$ is odd and $df^{n-1}$ is even. By defining $f^0$ to be even, this rule applies to all n.

Figure 3:
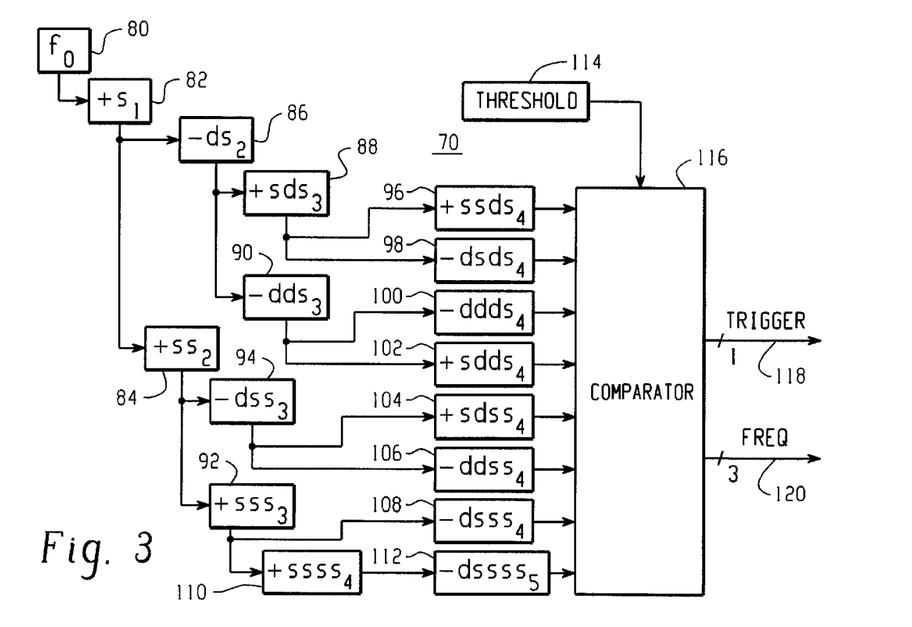
FIG. 3 is a block diagram illustration of wavelet function decomposition suitable for use in programming the gate array of the embodiment depicted in FIG. 2.
Figure 4A:
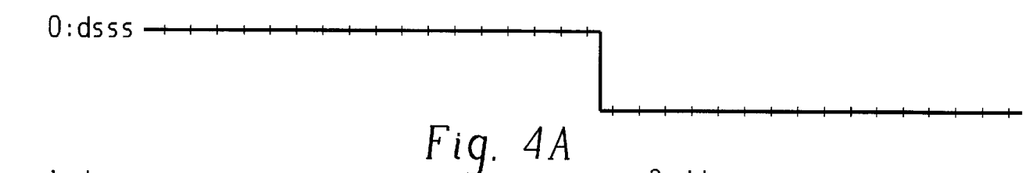
FIGS. 4A–4G depict time domain wave forms of the Haar wavelet functions used for one embodiment of the present invention.
Figure 4B:
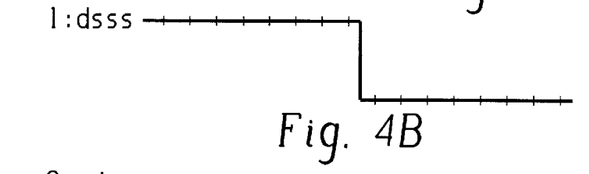
Figure 4C:
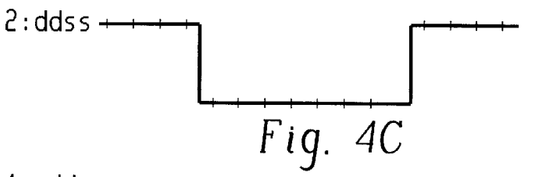
Figure 4D:
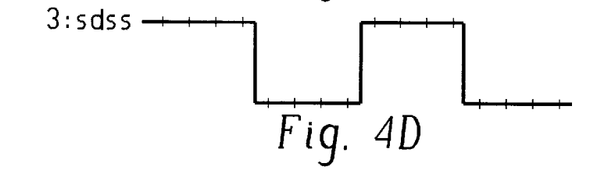
Figure 4E:
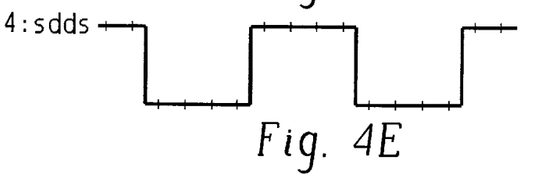
Figures 4F, 4H:
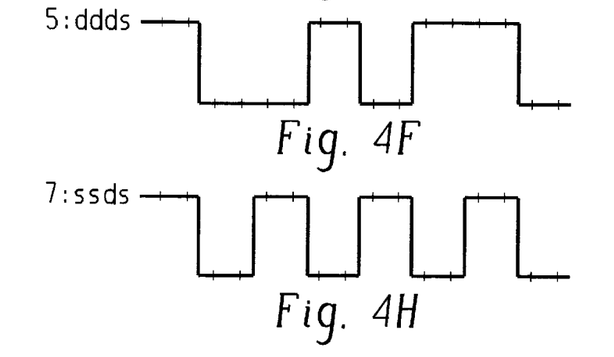
Figure 4G:
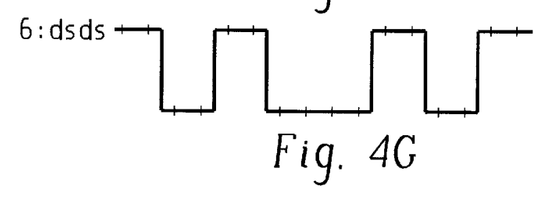
Figure 5A:
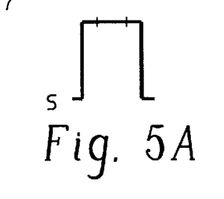
FIG. 5A–5H depict time domain wave forms of wavelet functions of a multi-resolution analysis embodiment of the present invention.
Figure 5B:
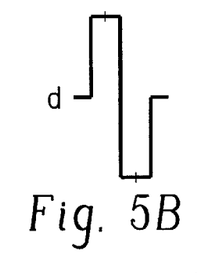
Figure 5C:
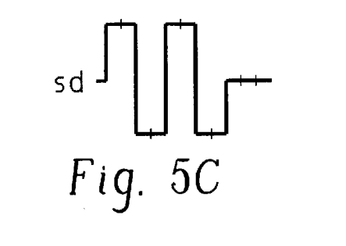
Figure 5D:
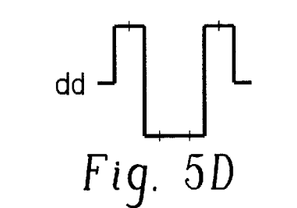
Figure 5E:
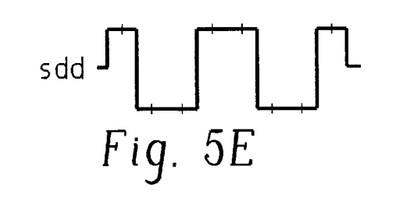
Figures 5F, 5H:
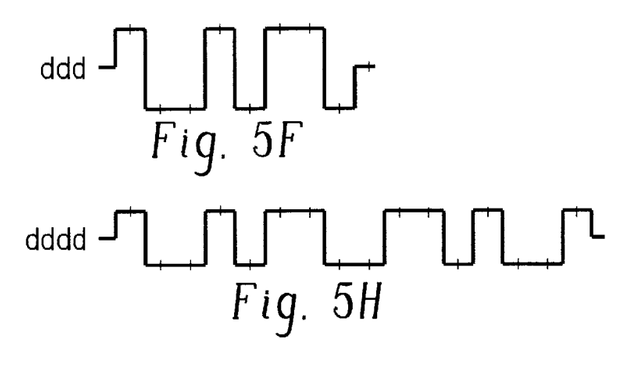
Figure 5G:
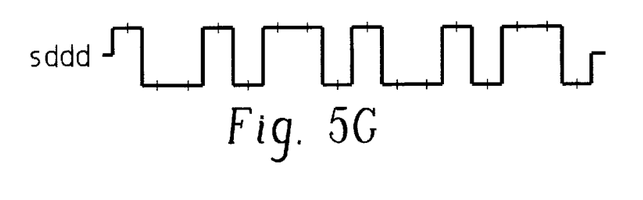

A suitable embodiment for use in programming the gate array 70 to decompose the sampled data signals of the time sequence into a plurality of frequency range signals using the aforementioned wavelet packet functions is shown by the block diagram schematic of FIG. 3. FIG. 3 illustrates the wavelet packet functions decomposition of the sampled data incoming signal $f^0_i$, for i=1, 2, 3 . . . etc. Each resultant smoothed component and detailed component signal is shown in the boxes. The arrowed lines starting at one box and ending at one or more boxes each point to a decomposed signal that has half the data rate and half the frequency-domain component of its "parent". The "+" and "−" in the boxes indicate whether the scaling function s("+") or the wavelet function d("−") has been applied. This is also indicated by the leftmost letter s or d in the box. The numbers in each box represent the order or stage of decomposition. In describing the functional block diagram schematic of FIG. 3, reference will be made to the equations described hereinabove.

Referring to FIG. 3, the data samples of the incoming signal are represented by the block 80. As indicated above, the Nyquist frequency of the data samples for the present embodiment is on the order of 375 megahertz. In the first stage of decomposition, the data samples of block 80 are decomposed into a smoothed component in accordance with Equation 5 described above. In the second stage of decomposition, the smoothed components of block 82 are further decomposed into a smoothed component at block 84 and a detailed components at block 86. The frequency range of the detailed component of block 86 is on the order of 94 to 188 megahertz and the frequency range of the smoothed component of block 84 is on the order of 0 to 94 megahertz. In the third stage of decomposition, the detailed component of block 86 is further decomposed into a smoothed component of block 88 and a detailed component of block 90 having frequency ranges of 141–188 megahertz and 94–141 megahertz, respectively. In this third order of decomposition stage, the smooth component of block 84 is further decomposed into a smoothed component of block 92 and a detailed component of block 94 which have frequency ranges of 0–47 megahertz and 47–94 megahertz, respectively. In a fourth stage of decomposition, the smoothed component of block 88 is further decomposed into a smoothed component of block 96 and a detailed component of block 98 having frequency ranges of 164–188 megahertz and 141–164 megahertz, respectively. Further, the detailed component of block 90 is further decomposed into a detailed component of block 100 and a smoothed component of block 102 having frequency ranges of 117–141 megahertz and 94–117 megahertz, respectively. Still further, the detailed component of block 94 is further decomposed into a smoothed component of block 104 and a detailed component of block 106 having frequency ranges of 70–94 megahertz and 47–70 megahertz, respectively. Still further, the smoothed component of block 92 is decomposed into a detailed component of block 108 and a smoothed component of block 110 having frequency ranges of 23–47 megahertz and 0–23 megahertz, respectively. And finally, in a fifth stage of decomposition, the smoothed component of block 110 is further decomposed into detailed components of block 112 having a frequency range of 12–23 megahertz. Accordingly, in the present embodiment, the frequency range signals of blocks 96, 98, 100, 102, 104, 106, 108, and 112 are the resultant signals from the decomposition of the sampled data signals of block 80 each representing the energy level corresponding to its respective frequency range.

Each of the aforementioned frequency range signals from the decompositions is compared with at least one threshold level signal provided by the block 114 in a comparator function 116. When the energy level of one of the frequency range signals in the time sequence exceeds a predetermined threshold as determined by the comparator block 116, a trigger signal 118 is generated and representative of the detection of a coherent burst electrical signal in the time sequence of the incoming signal. The comparator function 116 is also capable of generating a three bit code or data signal 120, the binary code of which being indicative of the frequency range signal or frequency bin that exceeds the predetermined threshold level. Accordingly, the embodiment described in connection with the schematic block diagram of FIG. 3 decomposes the sampled data signals of the time sequence into a plurality of frequency range signals using wavelet packet functions and detects a coherent burst electrical signal in the time sequence based on the frequency range signals decomposed thereby. The detection of the coherent burst electrical signal in the time sequence for the present embodiment is based on the energies of the resultant frequency range signals of the decomposition.

Note that for N total decomposition stages, if N is even, like 4, for example. the Haar wavelet packet function decomposition method involves no multiplication, but only addition or subtraction of successive signals and bit-shifting to normalize the coefficients. The physical interpretation of applying the above Haar wavelet scheme to a sample data signal is correlating the signal with a single cycle of a complex square wave at various frequencies. A better correlation is immediately obtained by averaging the successive data samples, for example. Averaging n data samples together corresponds to correlating the signal with n cycles of the square wave. Wavelet packet decomposition of the incoming signal with the Haar wavelet is considered robust if the signal is digitized at $\geq 4$ samples per cycle. However, in order to obtain very high sampling rates, the incoming signal is preferred to the clip using a one-bit digitizer so that each sample is either +1 or −1. In addition, the signal power, p, can be obtained by squaring the data sampled signal, $p=f^2$.

For the present embodiment, only wavelet functions 0–7 are used for embodying the burst detection system and FIG. 4 illustrates the time-domain waveforms of the fourth order wavelet functions 1–7 and the fifth order wavelet function 0. In the present embodiment, for normalized wavelet functions, the high binary state is considered as +1 and the low binary state is considered as −1. Also in the present embodiment, the wavelet time-domain functions are convolved with the sampled data time sequenced incoming signal to obtain the decomposed frequency range signals. For digital data, the convolusion may be simply a dot product. In other words, by shifting the time-domain wavelet function in time and convolving it with the data sampled incoming signal, a time-series of each decomposed signal is obtained. At the fourth order, 16 data samples of the time sequence are used for each decomposed signal datum and accordingly, at the fifth order, 32 data samples of the time sequence of the incoming signals are used.

In the alternative, a wavelet function transform method known as multiresolution analysis (MRA) using Haar wavelet functions may be used to program the gate array 70. For this method, each smoothed component $s^n$ having a $2^n\, \delta t$ sampling period may recursively be decomposed into a smoothed component $s^{n+1}$ and a detailed component $d^{n-1}$, each with an $2^{n+1}\, \delta t$ sampling period in accordance with Equations 13 and 14 below:

$$s_i^{n+1} = \langle s_i^n, \phi_i^{n+1}\rangle = \frac{1}{\sqrt{2}}(s_{2i-1}^n + s_{2i}^n), \text{ and} \quad \text{Equation 13}$$

$$d_i^{n+1} = \langle s_i^n, \psi_i^{n+1}\rangle = \frac{1}{\sqrt{2}}(s_{2i-1}^n - s_{2i}^n). \quad \text{Equation 14}$$

The detailed component $d^n$ contains information (odd component) on the amount of signal energy at frequency $1/[2^n\, \delta t]$. The signal power at frequency $1/[2^n\, \delta t]$ is $p^n(t)=(d^n)^2$. Note that this method also involves no multiplication of signals but only addition or subtraction and bit shifting for even n. In general, MRA uses 1 calculation per scale or order, N calculations for N-scale resolution, i.e. N frequency range signals or bands which is more efficient than the DFT methods that require order N(logN) calculations.

A physical interpretation of applying the foregoing described MRA method to an incoming signal is correlating the incoming signal with a single cycle of a complex square wave at various frequencies. A better correlation may be obtained by averaging successive $p^n(t)$ data. Accordingly, averaging m data samples together corresponds to correlating the incoming signal with m cycles of the square wave. Thus, applying running averages to $p^n$ will improve the correlation and optimize performance. The maximum $p^n$ of the frequency range signals 96–112 may be compared to the preset threshold level 114 in comparator 116 to determine if a coherent burst signal is present in the incoming signal. Time domain waveforms of exemplary wavelet functions for this MRA method are shown in FIGS. 5A through 5H.

Referring back to FIG. 2, the trigger signal 118 representing the detection of the coherent burst signal in the time sequence is provided to one or more digital processors for post processing represented by the block 130 along with the frequency range data signal 120. Also, the gate array 70 passes the clock signal CLK which is on the order of 94 megahertz to the post processing devices 130. In addition, the gate array 70 is capable of buffering 32 of the sampled data bits in the time sequence and providing them to the post-processing devices 130 over signal lines 132. The post-processing devices 130 utilize the information contained in the signals 118, 120 and 132 provided by the gate array to determine further information from the sampled data incoming signal based on the current application.

While the system and method of coherent signal detection in accordance with the present invention is described above as applying to a laser Doppler Velocimeter, it is understood that the principles of the present invention should not be so limited in application and may be applied to other systems like a LIDAR or radar or any system in which a reflected signal includes an intermittent burst electrical signal of unknown frequency which requires detection in a time sequence for information extraction. In addition, while the present embodiment is described in connection with a wavelet packet function decomposition method, it is understood that any wavelet function may be used for the decomposition process and falls within the broad scope of the inventive principles. Accordingly, the present invention should not be limited to any single embodiment, but rather construed in broad scope and breadth in accordance with the recitation of the appended claims.

What is claimed is:

1. A method of detecting a coherent signal of unknown frequency from an incoming electrical signal comprising a multiplicity of frequencies, said method comprising the steps of:
   generating a time sequence of sampled data signals from said incoming electrical signal;
   decomposing said sampled data signals of said time sequence into a plurality of frequency range signals using wavelet functions; and
   detecting a coherent signal in said time sequence based on said frequency range signals.

2. The method of claim 1 including the step of triggering the detection of the coherent signal in the time sequence when at least one of the frequency range signals exceeds a predetermined threshold.

3. The method of claim 1 wherein the coherent signal is detected in the time sequence based on the energies of the frequency range signals.

4. The method of claim 1 wherein the step of detecting includes the steps of:
   comparing the frequency range signals corresponding to each sampled data signal of the time sequence to at least one predetermined threshold signal; and
   detecting the coherent signal in the time sequence corresponding to at least one frequency range signal exceeding said predetermined threshold signal.

5. The method of claim 4 wherein the energies of the frequency range signals are compared with the at least one predetermined threshold; and the coherent signal is detected in the time sequence corresponding to the energy of at least one frequency range signal exceeding the corresponding threshold signal.

6. The method of claim 4 including the step of averaging the frequency range signals over time prior to comparing them to the at least one threshold signal.

7. The method of claim 4 including the steps of:
   determining the frequency range signal that exceeds the threshold signal; and
   generating a signal representative thereof.

8. The method of claim 1 wherein the sampled data signals are generated from the incoming signal in binary states.

9. The method of claim 1 wherein the sampled data signals are decomposed using wavelet packet functions.

10. The method of claim 1 wherein the sampled data signals are decomposed using Haar wavelet functions.

11. The method of claim 10 wherein the sampled data signals are decomposed using Haar scaling and wavelet functions to form smoothed and detailed components of the frequency range signals that are representative of the signal energy at the corresponding frequency range.

12. The method of claim 11 wherein the smoothed and detailed components of the frequency range signals are 4th order Haar wavelet packets.

13. The method of claim 11 wherein at least one of the smoothed and detailed components is a 5th order Haar wavelet packet.

14. The method of claim 1 wherein each sampled data signal is decomposed using a multiresolution analysis method.

15. The method of claim 1 wherein the step of detecting a coherent signal includes detecting a coherent burst electrical signal in the time sequence based on the frequency range signals.

16. A system for detecting a coherent signal of unknown frequency from an incoming electrical signal comprising a multiplicity of frequencies, said system comprising:
   means for generating a time sequence of sampled data signals from said incoming electrical signal;
   means for processing said sampled data signals of said time sequence into a plurality of frequency range signals using wavelet functions; and
   means for detecting a coherent signal in said time sequence based on said frequency range signals.

17. The system of claim 16 wherein the incoming signal is an analog signal; and wherein the generating means includes an analog-to-digital converter for digitizing the sampled data signals of tile time sequence.

18. The system of claim 17 wherein the analog-to-digital converter is a one bit converter.

19. The system of claim 17 wherein the analog-to-digital converter includes means for sampling the incoming signal at prespecified time intervals for generating the time sequence of sampled data signals for digitizing.

20. The system of claim 19 wherein the analog-to-digital converter samples and digitizes the incoming signal in real time.

21. The system of claim 16 wherein the processing means includes a programmed gate array.

22. The system of claim 16 including means for buffering a plurality of samples of the time sequence prior to being processed by the processing means.

23. The system of claim 16 wherein the processing means processes the sampled data signals in real time using wavelet functions.

24. The system of claim 16 wherein the detecting means includes means for comparing the frequency range signals of the time sequence to a predetermined threshold; and means for generating a signal indicative of the detection of the coherent signal corresponding to the occurrence of one of the frequency range signals exceeding said predetermined threshold.

25. The system of claim 24 wherein the comparing means compares the frequency range signals of the time sequence in real time; and wherein the signal indicative of the detection is generated at the occurrence of the threshold exceedance in the time sequence.

26. The system of claim 24 including means for identifying the frequency range of the signal that exceeds the threshold and for generating a signal representative thereof.

27. The system of claim 16 wherein the detecting means includes a programmed gate array.

28. A method of processing in a programmed gate array a time sequence of data samples of an electrical signal having a predetermined pass band frequency range for detecting a coherent signal therefrom, said method comprising the steps of:

decomposing said data samples of said electrical signal into a plurality of frequency range signals within said predetermined pass band frequency range using wavelet functions; and detecting a coherent signal in said time sequence based on said frequency range signals.

29. The method of claim 28 wherein the data samples are decomposed using wavelet packet functions.

30. The method of claim 28 wherein the data samples are decomposed using Haar wavelet functions.

31. The method of claim 30 wherein the data samples are decomposed using Haar scaling and wavelet functions to form smoothed and detailed components of the frequency range signals.

32. The method of claim 31 wherein the smoothed and detailed components are 4th order Haar wavelet packets.

33. The method of claim 31 wherein at least one of the smoothed and detailed components is a 5th order Haar wavelet packet.

34. The method of claim 28 wherein the data samples are decomposed using a multiresolution analysis method.

35. The method of claim 28 wherein the data samples are binary digital signals.

36. The method of claim 28 wherein the step of detecting includes the step of detecting a coherent burst signal in the time sequence based on the frequency range signals.

* * * * *